(12) United States Patent
Cartiglia

(10) Patent No.: US 10,933,402 B2
(45) Date of Patent: *Mar. 2, 2021

(54) CARBON FOAM-BASED CATALYST SUPPORT

(71) Applicant: James R. Cartiglia, Brentwood, TN (US)

(72) Inventor: James R. Cartiglia, Brentwood, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/835,508

(22) Filed: Mar. 31, 2020

(65) Prior Publication Data

US 2020/0360898 A1  Nov. 19, 2020

Related U.S. Application Data

(63) Continuation-in-part of application No. 16/414,854, filed on May 17, 2019, and a continuation-in-part of application No. 16/414,860, filed on May 17, 2019, now Pat. No. 10,619,543, and a continuation-in-part of application No. 16/414,866, filed on May 17, 2019, now Pat. No. 10,612,441, and a continuation-in-part of application No. 16/795,700, filed on Feb. 20, 2020.

(51) Int. Cl.

| | |
|---|---|
| *B01J 21/18* | (2006.01) |
| *B01D 53/94* | (2006.01) |
| *B01J 35/04* | (2006.01) |
| *B01J 35/10* | (2006.01) |
| *B01J 23/745* | (2006.01) |
| *B01J 23/755* | (2006.01) |
| *B01J 35/00* | (2006.01) |
| *B01J 37/02* | (2006.01) |
| *F01N 3/28* | (2006.01) |
| *B01J 23/34* | (2006.01) |

(52) U.S. Cl.
CPC ............. *B01J 21/18* (2013.01); *B01J 23/34* (2013.01); *B01J 23/745* (2013.01); *B01J 23/755* (2013.01); *B01J 35/0013* (2013.01); *B01J 35/04* (2013.01); *B01J 35/1028* (2013.01); *B01J 37/0215* (2013.01); *F01N 3/2803* (2013.01); *F01N 2330/22* (2013.01); *F01N 2370/02* (2013.01)

(58) Field of Classification Search
None
See application file for complete search history.

(56) References Cited

U.S. PATENT DOCUMENTS

| | | |
|---|---|---|
| 3,387,940 A | 6/1968 | McHenry et al. |
| 4,832,881 A | 5/1989 | Arnold et al. |
| 5,945,084 A | 8/1999 | Droege |
| 2004/0110633 A1 | 6/2004 | Deevi et al. |
| 2007/0036913 A1 | 2/2007 | Mercuri |
| 2007/0283782 A1 | 12/2007 | Mercuri |
| 2007/0286778 A1 | 12/2007 | Mercuri |
| 2008/0145642 A1 | 6/2008 | Shao et al. |
| 2010/0104496 A1 | 4/2010 | Miller et al. |
| 2010/0222214 A1 | 9/2010 | Mercuri |
| 2011/0066354 A1 | 3/2011 | Cassani et al. |
| 2014/0140909 A1 | 5/2014 | Qi et al. |
| 2020/0094238 A1 | 3/2020 | Zhou |

FOREIGN PATENT DOCUMENTS

| | | | |
|---|---|---|---|
| EP | 0747124 | 12/1996 | |
| EP | 0747124 A1 * | 12/1996 | ......... B01D 53/9454 |
| WO | WO95/11752 A1 | 5/1995 | |
| WO | WO-9511752 A1 * | 5/1995 | ............. B01J 35/04 |
| WO | WO 2013/175239 | 11/2013 | |

OTHER PUBLICATIONS

Yu et al. A Unit Cube-Based Model for Heat Transfer and Fluid Flow in Porous Carbon Foam. Journal of Heat Transfer, vol. 128. pp. 352-360 (Year: 2006).*
Yu et al. A Unit Cube-Based Model for Heat Transfer and Fluid Flow in Porous Carbon Foam. vol. 128. pp. 352-360 (Year: 2006).*
Ibrahim, Experimental and Numerical Investigations of Fluid Flow through Catalytic Converters, University of Guelph, Sep. 2017.
Ibrahim et al., Understanding Flow through Catalytic Converters, Proceedings of the 4th Intl Conf of Fluid Flow, Heat and Mass Transfer, Aug. 21-23, 2017.
Kurzydym et al., Experimental and numerical analysis of flow through catalytic converters for original part and Walker's replacement using reverse engineering and CFD, IOP Conf Series: Mat Sci and Eng 421 (2018) 042044.
Laxmi et al., Modeling and Simulation of Gas Flow Velocity in Catalytic Converter With Porous, Intl J Eng Res and App, vol. 3, Issue 3, May-Jun. 2013.
Manufacturers of Emission Controls Assoc, Tier 2/LEV II Emission Control Technologies for Light-Duty Gasoline Vehicles, Jun. 2007.
Manufacturers of Emission Controls Assoc, Aftermarket Converter Technology for Gasoline Light-Duty Vehicles, Nov. 2014.
Tsinoglou et al., Transient modelling of flow distribution in automotive catalytic converters, Applied Mathematical Modelling 28 (2004), Mar. 3, 2004.
Yu et al., A Unit Cube-Based Model for Heat Transfer and Fluid Flow in Porous Carbon Foam, Transactions of the ASME, vol. 128, Apr. 2006.

* cited by examiner

*Primary Examiner* — Jelitza M Perez
(74) *Attorney, Agent, or Firm* — OspreyIP, pllc

(57) ABSTRACT

A catalysis substrate, which includes an open cell carbon foam substrate having a geometric surface area of at least about 5000 $m^2/m^3$, wherein the substrate includes a catalytic metal.

24 Claims, No Drawings

CARBON FOAM-BASED CATALYST SUPPORT

RELATED APPLICATIONS

This application is a continuation-in-part of U.S. patent application Ser. No. 16/795,700, filed Feb. 20, 2020, and entitled "Emission Control Devices", which in turn is a continuation-in-part of each of the following copending applications:
U.S. patent application Ser. No. 16/414,854, filed May 17, 2019, and entitled "Foam-Based Substrate For Catalytic Converter";
U.S. patent application Ser. No. 16/414,860, filed May 17, 2019, and entitled "Catalytic Converter With Foam-Based Substrate Having Embedded Catalyst"; and
U.S. patent application Ser. No. 16/414,866, filed May 17, 2019, and entitled "Catalytic Converter Having Foam-Based Substrate With Nano-Scale Metal Particles",
the disclosures of each of which are incorporated herein by reference.

TECHNICAL FIELD

The present disclosure relates to the field of supports or substrates for catalysis reactions, where the support is carbon foam as the substrate for catalyst particles, particularly catalytic metals. In some embodiments, the support is used to form emission control devices, such as those used in vehicles. The emission control devices can be, in certain embodiments, catalytic converters or diesel particulate filters (sometimes referred to as diesel traps). More specifically, the present disclosure relates to foam-based substrates including catalytic metals.

BACKGROUND

Catalysis reactions require contact between the catalytic materials and the reactants, which are often in a fluid or gas. For instance, internal combustion gasoline and diesel engine exhaust contains environmentally and biologically harmful compositions, including hydrocarbons, carbon monoxide, and nitrogen oxide which arise from combustion of gasoline, diesel fuel, or other fuels. Catalytic converters were developed for gasoline vehicles to reduce the emission of these harmful compositions, and, in the U.S., have been installed on passenger cars and light-duty trucks since 1975.

Catalytic converters reduce vehicle exhaust emission levels by chemically converting engine-out emissions before the exhaust gas leaves the tailpipe. Conventionally, a catalytic converter contains a "honeycomb" ceramic substrate housed in a stainless steel canister that directs exhaust gases through narrow channels. A catalyst layer is applied to the surface of the channels and facilitates the conversion of pollutants primarily into water vapor, carbon dioxide, and nitrogen. The catalysts employed in most cases are noble metals, such as platinum (Pt), rhodium (Rh), and palladium (Pd).

Current catalytic converters are commonly referred to as three-way catalytic converters due to the three simultaneous reactions occurring over the catalyst. These include two oxidation reactions to reduce hydrocarbons (HC) and carbon monoxide (CO) and a reduction reaction involving oxides of nitrogen (NOx) with CO over a suitable catalyst to reduce NOx to nitrogen gas and carbon dioxide.

The exact combination of catalytic metals differs according to the level of engine-out emissions and the required emission controls. Current catalytic converter designs are more than 95% efficient in removing HCs and CO, and at least 85% effective at reducing NOx over the lifetime of the converter.

Traditionally, catalytic converters are prepared by separately mixing oxidative catalytic precious metals, such as platinum or palladium, with aluminum oxide, water, and other components to make a slurry in one container and mixing one or more reductive catalytic precious metals, such as rhodium, with cerium zirconium oxide, water, and other components to make a second slurry in a second container. The slurries are normally referred to as oxidative and reductive washcoats. A ceramic monolith, which can be cylindrically shaped, having a grid or "honeycomb" array structure, is dipped into one of the washcoats to form a first catalytic layer on the monolith. After drying and calcining, the ceramic monolith is dipped into the other washcoat to form a second layer. The ceramic monolith is then fitted into a shell of a catalytic converter, which connects to the engine for treating exhaust gas.

A diesel engine particulate filter, or simply diesel particulate filter (DPF), is an exhaust aftertreatment device that traps particulate matter from diesel engine exhaust, such as soot and ash. A conventional diesel particulate filter typically uses a substrate made of a ceramic material that is formed into a honeycomb structure.

In order to reduce emissions from diesel vehicles, diesel particulate filters capture and store exhaust soot, which must be periodically burned off to regenerate the filter. The regeneration process burns off excess soot deposited in the filter, which prevents harmful exhaust emission and the black smoke that can be observed emitted from diesel vehicles when accelerating. Engine manufacturers use diesel particulate filters to trap particulate matter in order to meet relevant emission standards.

Just like there are two main particulates being filtered, there are two types of cleanings that are required for diesel particulate filters. Regeneration cleans out the soot by converting the carbon to carbon dioxide, and the ash is removed by removing the filter and cleaning it in a machine with compressed air.

In a diesel exhaust system, the exhaust first passes over a diesel oxidation catalyst (DOC), then passes through the diesel particulate filter, which traps soot particles. Passive regeneration happens when heat in the engine builds to the point: where soot, or carbon, is combined with oxygen to create carbon dioxide. Since carbon dioxide is a gas, it can pass through the filter.

Ash, on the other hand, is already a byproduct of combustion, so heat from the engine is generally incapable of converting it. Over time, the ash will build up to the point where the filter has to be physically removed and cleaned. This filter can then be reinstalled and reused.

Passive regeneration occurs as the vehicle is driven normally under load; the driver is not aware that it is happening. It may not always keep the diesel engine particulate filter clean over time, so the filter may have to undergo active regeneration. Active regeneration takes place when the engine isn't creating the heat it needs. Once the soot level reaches a certain point, the engine injects fuel into the exhaust stream, which goes over the oxidation catalyst and oxidizes the fuel to create heat. The heat created from the fuel oxidizing is then used to convert soot to carbon dioxide.

Both active and passive regeneration happen automatically and without driver input. Active regeneration can occur automatically any time the vehicle is moving. The exhaust gas temperature could reach 1500° F. (800° C.).

BRIEF SUMMARY

The present disclosure relates to open cell carbon foam substrates for use in catalysis; in an embodiment, the open cell carbon foam substrates are used in emission control devices, such as catalytic converters or diesel engine particulate filters. By "open cell" is meant that the pores of the foam are interconnected (rather than sealed), allowing gases or other fluids to flow therethrough. The substrates can provide for more uniform fluid or gas flow as compared to conventional ceramic monoliths, while allowing for improved contact with catalyst particles.

More particularly, a purpose of the substrate is to provide a relatively large geometric surface area (GSA). For instance, the GSA of a substrate for a catalytic converter is a key factor in determining both the quantity of the catalyst that is required and the conversion efficiency of the converter. A higher GSA makes it possible to reduce the quantity of catalyst and increase the contact between the catalyst and the exhaust gas.

In some embodiments, the GSA of the substrate of the present disclosure is at least about 5000 $m^2/m^3$. In other embodiments, the GSA is at least about 8000 $m^2/m^3$, or even at least 15,000 $m^2/m^3$ or higher. In some embodiments, the GSA is up to about 35,000 $m^2/m^3$. Thus, in embodiments, the GSA of the substrate of the present disclosure can range from about 5000 $m^2/m^3$ to about 35,000 $m^2/m^3$, or 8000 $m^2/m^3$ to about 35,000 $m^2/m^3$, or even 15,000 $m^2/m^3$ to about 35,000 $m^2/m^3$.

In embodiments, carbon foam substrate has a density of about 0.03 to about 0.9 grams per cubic centimeter (g/cc), with a surface area of about 200 to about 900 square meters per gram ($m^2/g$). In an embodiment, the compressive strength of the foam should be at least about 35 kilograms per square centimeter ($kg/cm^2$)(measured by, for instance, ASTM C695).

The use of the foam substrate of this disclosure should engender a pressure drop of no greater than about 300 Pa, and, in embodiments, from about 25 to about 300 Pa; in certain embodiments, the pressure drop engendered by the carbon foam substrate of the present disclosure should be no greater than about 90 Pa, and can be from about 50 to about 90 Pa. In other embodiments, the foam substrate of this disclosure should lead to a pressure drop of no greater than 80% of the pressure drop observed when a conventional catalysis substrate, for instance one for an emission control device such as a catalytic converter or diesel engine particulate filter, is employed in its place. For example, at conventional exhaust velocities exiting the engine (taken to be 0.025 $m^3/s$), a conventional catalytic converter creates a pressure drop of at least about 150 Pa; sometimes the observed pressure drop is higher than 200 Pa. An emission control device utilizing the substrate of this disclosure, at those exhaust velocities, should provide a pressure drop of no greater than 120 Pa. In certain embodiments the pressure drop is less than 90 Pa.

The carbon foam should, in some embodiments, have a relatively uniform distribution of pores in order to provide relatively consistent gas flow therethrough. In addition, in certain embodiments the pores are relatively isotropic, by which is meant that the pores are relatively spherical and have, on average, an aspect ratio of between about 1.0 (which represents a perfect spherical geometry) and about 1.5. The aspect ratio is determined by dividing the longest dimension of any pore with its shortest dimension. The foam should, in some embodiments, have a total porosity of about 65% to about 95%, more preferably about 70% to about 95%.

In some embodiments, the carbon foam useful as a catalysis substrate exhibits a permeability of at least about 8.0 darcys; in other embodiments the carbon foam has a permeability of at least about 12.0 darcys, or even at least about 15.0 darcys (as measured, for instance, by ASTM C577). In yet other embodiments, the carbon foam of this disclosure exhibits a permeability of at least about 20.0 darcys. From a practical standpoint, the foam has a permeability of from about 15.0 darcys to about 35.0 darcys.

DETAILED DESCRIPTION

Carbon foams for use as substrates can be formed of a variety of materials, in a variety of ways, provided they meet the requirements detailed herein. For instance, in some embodiments the foams can be formed from polymeric foams, such as phenolic or polyurethane foam, as starting materials as discussed in US Application Publication No. 2010/0104496 and U.S. Pat. No. 3,387,940. In other embodiments, the foam starting materials can be formed from polyacrylonitrile (PAN) or other acrylonitrile materials, as disclosed by U.S. Pat. No. 4,832,881. Other starting materials that can be used in some embodiments are derived from organic gels which may be prepared from hydroxylated benzenes (such as phenol, catechol, hydroquinone, and phioroglucinol) and aidehydes (such as formaldehyde and furfural), as discussed in U.S. Pat. No. 5,945,084.

Phenolic and Polyurethane Polymeric Foams

In an embodiment, to produce the substrate of the present disclosure from polymeric foams, a polymeric foam block, particularly a phenolic foam block, is carbonized in an inert or air-excluded atmosphere, at temperatures which can range from about 500° C., more preferably at least about 800° C., up to about 3200° C.

The foam is prepared by adjusting the water content of the resin and adding a surfactant (e.g., an ethoxylated nonionic), a blowing agent (e.g., pentane, methylene chloride, or chlorofluorocarbon), and a catalyst (e.g., toluenesulfonic acid or phenolsulfonic acid). The sulfonic acid catalyzes the reaction, while the exotherm causes the blowing agent, emulsified in the resin, to evaporate and expand the foam. The surfactant controls the cell size as well as the ratio of open-to-closed cell units.

The preferred phenol is resorcinol. However, other phenols of the kind which are able to form condensation products with aldehydes can also be used. Such phenols include monohydric and polyhydric phenols, pyrocatechol, hydroquinone, alkyl substituted phenols, such as, for example, cresols or xylenols; polynuclear monohydric or polyhydric phenols, such as, for example, naphthols, p.p'-dihydrexydiphenyl dimethyl methane or hydroxyanthracenes.

The phenols used to make the foam starting material can also be used in admixture with non-phenolic compounds which are able to react with aldehydes in the same way as phenol.

The preferred aldehyde for use in the solution is formaldehyde. Other suitable aldehydes include those which will react with phenols in the same manner. These include, for example, acetaldehyde and benzaldehyde.

In general, the phenols and aldehydes which can be used in the process of the disclosure are those described in U.S. Pat. Nos. 3,960,761 and 5,047,225.

The polymeric foam used as the starting material in the production of the carbon foam should have an initial density which mirrors the desired final density for the carbon foam which is to be formed.

As noted, in order to convert the polymeric foam to a carbon foam, the foam is carbonized by heating to a temperature of from about 500° C., more preferably at least about 800° C., up to about 3200° C., in an inert or air-excluded atmosphere, such as in the presence of nitrogen. The heating rate should be controlled such that the polymer foam is brought to the desired temperature over a period of several days, since the polymeric foam can shrink by as much as about 50% or more during carbonization. Care should be taken to ensure uniform heating of the polymer foam piece for effective carbonization.

By use of a polymeric foam heated in an inert or air-excluded environment, a non-graphitizing glassy carbon foam is obtained, which has the approximate density of the starting polymer foam. The carbon foam has a relatively uniform distribution of isotropic pores having, on average, an aspect ratio of between about 1.0 and about 1.5.

In other embodiments, the polymeric foam-based carbon foam of the present disclosure can be a rigid polyurethane foam of the polyester type. These foams can be prepared by reacting a polyester with an organic polyisocyanate. Polyesters that are suitable reactants with the polyisocyanates are those having reactive hydrogen-containing terminal groups, preferably predominantly hydroxyl groups. The hydroxyl number of the polyester is in the range from about 100 to about 600.

Typical polyesters are propylene glycol, ethylene glycol, glycerol, reaction products of polyols such as aliphatic polyols, i.e., polyethylene glycols, polypropylene glycols, polybutylene glycols, polyoxyethyleneoxybutylene glycols, polyoxypolypropyleneoxybutylene glycols, 1,2,6-hexane triol, 1,1,1-trimethylolpropane, and the like, with a polycarboxylic acid such as oxalic acid, succinic acid, maleic acid, adipic acid, sebacic acid, isosebacic acid, phthalic acid, and the like. Other useful polyesters comprise homopolymers of lactones, notably epsilon, caprolactones, started with a reactive hydrogen-containing compound, Such as those disclosed in U.S. Pat. No. 2,914,556. A variety of organic polyisocyanates may be employed for reaction with the above-described polyesters to provide suitable rigid urethane foams, as would be familiar to the skilled artisan.

Preparation of the foam can be carried out by the one-shot or semi-prepolymer techniques, each of which are well known. In the semi-prepolymer technique, the polyester reactant is partially extended with excess isocyanate to provide a reaction product containing a high percentage of free isocyanate groups (20 to 35%) which is foamed at a later stage by reaction with additional polyester, catalyst and a blowing agent. In the one-shot technique, all of the reactants are reacted simultaneously with the foaming operation.

The amount of isocyanate employed will depend upon the density of the foam and the amount of cross-linking desired. In general, the total —NCO equivalent to total active hydrogen equivalent (i.e., hydroxyl plus water, if water is present) should be such as to provide a ratio of 0.8 to 1.2 equivalents of —NCO per equivalent of active hydrogen, and preferably a ratio of about 1.0 to 1.1 equivalents of —NCO per reactive hydrogen.

Foaming can be accomplished by employing a small amount of water in the reaction mixture (for example, from about 0.5 to 5 weight percent of water, based on total weight of the reaction mixture), or through the use of blowing agents which are vaporized by the exotherm of the isocyanate-reactive hydrogen reaction, or by a combination of the two methods. All of these methods are known in the art. The curing step comprises maintaining the polyurethane foam at an elevated temperature up to about 200° C. and in an oxygen-containing atmosphere for a sufficient time period to increase the degree of cross-linking of the polymers present in the foam. Moreover, unreacted constituents are eliminated from the foam at this time. The curing time is dependent on the particular polyurethane foam employed, the curing temperature, the degree of cross-linking present in the foam prior to curing, etc. The curing time can range from about 2 hours to about 64 hours.

The oxidizing step comprises maintaining the foam at a temperature in the range from about 200° C. to about 255° C. and in an oxygen-containing atmosphere for a sufficient time period to bring about a weight loss of the foam of at least about 3.5 percent. During this step some oxidation of the foam structure is believed to take place. It is important that the temperature is maintained with in the aforesaid limits since otherwise the foam fuses, collapses, and becomes distorted.

The pyrolyzing step comprises maintaining the foam, at a temperature in the range from about 500° C. to about 1000° C. for a sufficient time period to produce a homogeneous, porous matrix consisting substantially of carbon. The pyrolyzing step is carried out in an oxygen-free atmosphere, such as a vacuum or an inert gas atmosphere comprising nitrogen, argon, krypton, xenon, helium, and the like. As a general rule, the pyrolyzing temperature should exceed the temperature at which the resultant product is to be used.

In some embodiments when the foam is a phenolic or polyurethane polymeric foam, a graphitization heat treatment is carried out at a temperature above about 2200° C. and in an oxygen-free atmosphere. A graphitization temperature in the range from about 2800° C. to about 3000° C. is preferred. The temperature and the duration of the graphitization treatment are dependent on the degree of graphitization desired and also on the physical size of the carbon foam piece being graphitized. The time period at the aforesaid temperatures can be as short as five minutes and as long as eight hours. In most instances a time period of about thirty minutes is sufficient for complete graphitization.

Acrylonitrile Foams

In another embodiment, a carbon foam useful as the substrate in accordance with this disclosure is prepared by dissolving a carbonizable polymer or copolymer in a solvent at a temperature sufficient to effect complete dissolution. The polymer or copolymer comprises acrylonitrile-based polymers, such as polyacrylonitrile (PAN), and acrylonitrile based copolymers, such as polyacrylonitrile-co-maleic anhydride. In other embodiments, other suitable carbonizable polymers can be employed, including phenolics, guar-gums, polyesters, poly(furfuryl alcohol), polyimides, cellulose polymers (such as Rayon), polyamides, polyacrylethers, polyphenylenes, polyacenaphthalenes, polytriadiazoles and polyvinylpyridines.

The dissolution of the carbonizable polymeric materials in the solvent can be carried out at a temperature of from about 100 to about 200° C. After dissolution of the polymer or copolymer, the solution is poured into a mold and is then cooled. A typical cooling rate or quench is about 10° C. per minute. After the quench, the solvent is removed from the solution and the polymer or copolymer can be carbonized to produce the foams of the present disclosure.

In some embodiments, the solvent is chosen so that liquid phase separation occurs during the quench. The dissolved polymeric solution is cooled in the mold so that liquid phase separation occurs. Cooling may be continued until the solvent freezes in which case the solvent is removed by sublimation under vacuum (freeze-drying). If the solvent is not frozen, then it may be removed by extraction. The isotropic low density, open-celled carbon foam is then produced by carbonizing the desired polymeric materials following removal of the solvent. Suitable solvents for freeze-drying to be used in the preparation of the isotropic foams include: maleic anhydride, 70-90% methylsulfone with 10-30% cyclohexanol, 85-95% methyl sulfone with 5-15% water, and 40-60% methyl sulfone with 60-40% norcamphor (all solvent percentages are given as wt/wt except for aqueous methyl sulfone, which is given as wt/volume). Preferred solvents which can be extracted to prepare isotropic foams are: 75-95% dimethyl formamide with 5-25% water (volume/volume), 70-90% dimethyl formamide with 10-30% ethylene glycol, 70-90% 1-methyl-2-pyrrolidone with 10-30% ethylene glycol and 40-65% succinonitrile with 35-60% maleic anhydride.

The carbonizable polymeric materials prepared as indicated above can be carbonized in a high temperature oven. Various carbonization schemes are possible, including pretreating after removal of solvent and before carbonizing by subjecting the foam to an oxygen or air atmosphere for about 12-24 hours at temperatures of from about 180-260° C. This preliminary step allows a higher graphitic carbon content in the final carbonized foam. Following the pretreatment, the polymeric materials can, in certain embodiments, be heated to a temperature of from about 500-2500° C. for about 6-10 hours in the presence of an inert gas. Carbonization can be carried out by heating the foams slowly (5° C. per minute) under a continuous flow of the inert gas. The gas used in some embodiments is argon, but other inert gases such as nitrogen, neon, krypton or xenon are also suitable. During this heating process, the foams will shrink and therefore densify to an extent depending upon the carbonization scheme. This effect can be offset by making the starting polymer foam at a lower density than required in the resulting carbon foam.

Organic Gels

In another embodiment, carbon substrates can be prepared by high temperature pyrolysis of a low density open cell organic foam composite, which is prepared from a suitable substrate and an organic gel, by:

(a) forming a reaction mixture comprising one or more hydroxylated benzene compounds, one or more aldehydes, one or more catalysts, and water, wherein the molar ratio of the hydroxylated benzene compounds to the catalysts in the reaction mixture is greater than about 1000; and,
(b) infusing a porous carbon substrate or a porous organic substrate (e.g., a fiber or sheet) with the reaction mixture to form an infused carbon or porous organic substrate;
(c) heating the infused porous substrate at a gelation temperature for a gelation time to form an organic gel/porous substrate composite;
(d) heating the organic gel/porous substrate composite at a curing temperature for a curing time to form a cured organic gel/porous substrate composite;
(e) drying the cured organic gel/porous substrate composite to form an organic foam/porous substrate composite; and,
(f) pyrolyzing the organic foam/porous substrate composite at a pyrolysis temperature to form a carbon foam/carbon substrate composite.

Again, in some embodiments, a graphitization heat treatment is then carried out at a temperature above about 2200° C. and in an oxygen-free atmosphere. A graphitization temperature in the range from about 2800° C. to about 3000° C. is preferred. The temperature and the duration of the graphitization treatment are dependent on the degree of graphitization desired and also on the physical size of the carbon foam piece being graphitized. The time period at the aforesaid temperatures can be as short as five minutes and as long as eight hours. In most instances a time period of about thirty minutes is sufficient for complete graphitization.

While certain embodiments of carbon foams useful as a catalysis substrate in accordance with this disclosure have been taught, any carbon foam having the desired characteristics can be employed. For instance, regardless of the starting foam, the GSA of the substrate of the present disclosure is at least about 5000 $m^2/m^3$ and can be at least about 8000 $m^2/m^3$, or even at least 15,000 $m^2/m^3$ or higher, and, in embodiments, is up to about 35,000 $m^2/m^3$. Thus, in some embodiments, the GSA of the substrate carbon foam can range from about 5000 $m^2/m^3$ to about 35,000 $m^2/m^3$, or 8000 $m^2/m^3$ to about 35,000 $m^2/m^3$, or even 15,000 $m^2/m^3$ to about 35,000 $m^2/m^3$.

Likewise, in certain embodiments, the carbon foam substrate has a density of about 0.03 to about 0.9 grams per cubic centimeter (g/cc), with a surface area of about 200 to about 900 square meters per gram ($m^2/g$), and the compressive strength of the foam should be at least about 35 kilograms per square centimeter ($kg/cm^2$)(measured by, for instance, ASTM C695).

The use of the foam substrate of this disclosure should create a pressure drop of no greater than about 300 Pa, and, in embodiments, from about 25 to about 300 Pa regardless of the carbon foam starting material; in certain embodiments, the pressure drop should be no greater than about 90 Pa, and can be from about 50 to about 90 Pa. In other embodiments, the foam substrate of this disclosure should lead to a pressure drop of no greater than 80% of the pressure drop observed when a conventional catalysis substrate, for instance one used in an emission control device, is employed in its place. Thus, when a carbon foam in accordance with this disclosure is used in an emission control device, it should provide a pressure drop of no greater than 120 Pa at an exhaust velocity of 0.025 $m^3/s$. In certain embodiments the pressure drop is less than 90 Pa.

In some embodiments, regardless of the specific nature of the starting foam, the carbon foam useful as a substrate exhibits a permeability of at least about 8.0 darcys; in other embodiments the carbon foam has a permeability of at least than about 12.0 darcys, or at least about 15.0 darcys (as measured, for instance, by ASTM C577). In yet other embodiments, the carbon foam of this disclosure exhibits a permeability of at least about 20.0 darcys. From a practical standpoint, the foam has a permeability of from about 15.0 darcys to about 35.0 darcys.

The carbon foams described herein can, in some embodiments, be formed into a catalysis substrate by conventional methods. In some embodiments, the substrate can be formed into two- or three-way catalytic converters by conventional methods which are known to the skilled artisan. For instance, in certain embodiments, three-way catalytic converters can be prepared using the described carbon foam substrates by separately mixing catalytic metals such as oxidative precious metals, like platinum or palladium, with aluminum oxide, water, and other components to make a slurry in one container and mixing catalytic metals such as reductive precious metals, like rhodium, with cerium, zirconium oxide, water, and other components to make a second slurry in a second container. The slurries are normally referred to as oxidative and reductive washcoats. In some embodiments, the oxidative washcoat includes anywhere from about 25% to about 75% of the oxidative precious metals; the reductive washcoat includes anywhere from 5% to about 50% of the reductive precious metals.

Similarly, the carbon foams can be formed into diesel particulate filters containing catalytic metals by conventional methods, using washcoats as described above. Typically, oxidative washcoats are employed with diesel particulate filters. When the carbon foam-based substrates of this disclosure are employed in a diesel particulate filter, at least partial graphitization of the foam can be advantageous in certain embodiments. The electrical resistance of graphitic foams can permit the use of the foam as a heating element to assist in burning off the exhaust soot, to prolong the life of the filter, and/or to prolong the time between filter cleanings.

The carbon foam is dipped into a washcoat to form a first catalytic layer on and throughout the foam, which in some embodiments is followed by drying and calcining. In certain embodiments, after drying and calcining, the carbon foam substrate is dipped into the another washcoat to form a second layer (when a second layer is employed). In embodiments, the carbon foam including the washcoat layer(s) can be fitted into a shell of a catalytic converter or diesel engine particulate filter, which connects to the engine for treating exhaust gas.

In other embodiments, precious metals can be incorporated into the starting materials used to form the carbon foams of this disclosure. For instance, the precious metals, such as platinum or palladium, with aluminum oxide, and rhodium with cerium and zirconium oxide, can be incorporated into the phenolic, polyurethane, or polyester resin, or the acrylonitrile-based polymers, or the organic gel, from which the carbon foam is formed. In this manner, the catalytic metals are present within the struts/walls of the carbon foam substrate, which can increase contact with the gases and/or fluids and could reduce the amount of catalyst needed.

In another embodiment, the catalytic metals can comprise non-noble metal nano-scale catalyst particles, as described, for instance, in US Patent Application Publication Nos. 2010/0222214, 2007/0286778, 2007/0283782, and 2007/0036913, the disclosures of which are incorporated herein by reference. Non-noble metals are metals other than the noble metals; the noble metals are generally considered to be gold, silver, platinum, palladium, iridium, rhenium, mercury, ruthenium, and osmium. Thus, less costly metals, such as iron, nickel, and manganese, can be employed as the catalyst in the emission control device, reducing the cost of manufacture. By nano-scale particles is meant particles having an average diameter of no greater than about 1,000 nanometers (nm), e.g., no greater than about one micron. More preferably, the particles have an average diameter no greater than about 250 nm, most preferably no greater than about 20 nm.

Where nano-scale non-noble metal catalysts are employed, they can be incorporated into the washcoats described above, in full or partial replacement of or in addition to the "conventional" precious metal catalysts. Additionally, the non-noble metal catalysts can also be incorporated into the starting materials used to form the carbon foams of this disclosure, again, in full or partial replacement of or in addition to the "conventional" precious metal catalysts.

The nano-scale particles can be roughly spherical or isotropic, meaning they have an aspect ratio of about 1.4 or less, although particles having a higher aspect ratio can also be prepared and used as catalyst materials. Aspect ratio refers to the ratio of the largest dimension of the particle to the smallest dimension of the particle (thus, a perfect sphere has an aspect ratio of 1.0). The diameter of a particle for the purposes of this disclosure is taken to be the average of all of the diameters of the particle, even in those cases where the aspect ratio of the particle is greater than 1.4.

In one embodiment, a decomposable non-noble metal-containing moiety is fed into a reactor vessel and sufficient energy to decompose the moiety applied, such that the moiety decomposes and non-noble metal nano-scale particles are deposited on a support or collected by a collector. The decomposable moiety used herein can be any decomposable non-noble metal-containing material, including an organometallic compound, a metal complex or a metal coordination compound, provided that the moiety can be decomposed to provide free metals, such that the free metal can be deposited on a support or collected by a collector. In certain embodiments, the decomposable moiety comprises one or more non-noble metal carbonyls, such as nickel or iron carbonyls.

The particular decomposable moiety or moieties employed depends on the catalyst particle desired to be produced. In other words, if the desired nano-scale catalyst particles comprise nickel and iron, the decomposable moieties employed can be nickel carbonyl, $Ni(CO)_4$, and iron carbonyl, $Fe(CO)_5$. In addition, polynuclear metal carbonyls such as diiron nonacarbonyl, $Fe_2(CO)_9$, triiron dodecocarbonyl, $Fe_3(CO)_{12}$, decacarbonyldimanganese, $Mn_2(CO)_{10}$ can be employed in the production of nano-scale catalyst particles in accordance herewith. The polynuclear metal carbonyls can be particularly useful where the nano-scale catalyst particles desired are alloys or combinations on more than one metallic specie.

Generally speaking, carbonyls are transition metals combined with carbon monoxide and have the general formula $M_x(CO)_y$, where M is a metal in the zero oxidation state and where x and y are both integers. While many consider metal carbonyls to be coordination compounds, the nature of the metal to carbon bond leads some to classify them as organometallic compounds.

The metal carbonyls useful in producing nano-scale catalyst particles in accordance with the present disclosure can be prepared by a variety of methods, many of which are described in "Kirk-Othmer Encyclopedia of Chemical Technology," Vol. 5, pp. 131-135 (Wiley Interscience 1992). For instance, metallic nickel and iron can readily react with carbon monoxide to form nickel and iron carbonyls, and it has been reported that cobalt, molybdenum and tungsten can also react carbon monoxide, albeit under conditions of higher temperature and pressure. Other methods for forming metal carbonyls include the synthesis of the carbonyls from salts and oxides in the presence of a suitable reducing agent (indeed, at times, the carbon monoxide itself can act as the reducing agent), and the synthesis of metal carbonyls in ammonia. In addition, the condensation of lower molecular weight metal carbonyls can also be used for the preparation of higher molecular weight species, and carbonylation by carbon monoxide exchange can also be employed.

The synthesis of polynuclear and heteronuclear metal carbonyls, including those discussed above, is usually effected by metathesis or addition. Generally, these materials can be synthesized by a condensation process involving either a reaction induced by coordinatively unsaturated species or a reaction between coordinatively unsaturated species in different oxidation states. Although high pressures are normally considered necessary for the production of polynuclear and heteronuclear carbonyls (indeed, for any metal carbonyls other than those of transition metals), the synthesis of polynuclear carbonyls, including manganese, ruthenium and iridium carbonyls, under atmospheric pressure conditions is also believed feasible.

The production process for nano-scale metal particles is advantageously practiced in an apparatus comprising a reactor vessel, at least one feeder for feeding or supplying the decomposable moiety into the reactor vessel, a support or collector which is operatively connected to the reactor vessel for deposit thereon or collection thereby of nano-scale catalyst particles produced on decomposition of the decomposable moiety, and a source of energy capable of decomposing the decomposable moiety. The source of energy should act on the decomposable moiety such that the moiety decomposes to provide nano-scale metal particles which are deposited on the support or collected by the collector.

The support or collector can be any material on which the non-noble metal nano-scale catalyst particles produced from decomposition of the decomposable moieties can be deposited or in which they can be collected; in one embodiment, the collector can be a centrifugal or cyclonic collector.

The energy employed to decompose the decomposable moiety can be any form of energy capable of accomplishing this function. For instance, electromagnetic energy such as infrared, visible, or ultraviolet light of the appropriate wavelengths can be employed. Additionally, microwave and/or radio wave energy, or other appropriate forms of energy can also be employed (example, a spark to initiate "explosive" decomposition assuming suitable moiety and pressure), provided the decomposable moiety is decomposed by the energy employed. Thus, microwave energy, at a frequency of about 2.4 gigahertz (GHz) or induction energy, at a frequency which can range from as low as about 180 hertz (Hz) up to as high as about 13 mega Hz can be employed. A skilled artisan would readily be able to determine the form of energy useful for decomposing the different types of decomposable moieties which can be employed.

One preferred form of energy which can be employed to decompose the decomposable moiety is heat energy supplied by, e.g., heat lamps, radiant heat sources, or the like. Heat can be especially useful for highly volatile moieties, such as non-noble metal carbonyls. In such case, the temperatures needed are no greater than about 250° C. Indeed, generally, temperatures no greater than about 200° C. are needed to decompose the decomposable moiety and produce nano-scale catalyst particles therefrom.

By controlling the nature of the decomposable moiety introduced into the reactor vessel used in the production of nano-scale particles, through feeders, the rate of feeding of each decomposable moiety, and the order in which different species are fed into the reactor vessel, the catalyst particles produced can be controlled to a much greater degree than previously thought possible. By this is meant a significantly higher percentage of the specific desired catalyst particle (referred to as the principal particle) is produced. For example, if a catalyst particle containing a ratio of nickel atoms to iron atoms to manganese atoms of 3:2:2 is desired, a higher percentage of 3:2:2 particles will be produced (as compared to, for instance, 3:3:3 or 1:1:3, etc. particles).

In another embodiment, chain agglomerations of nano-scale metal particles can be produced, which comprise hundreds, or even thousands, of nano-scale metal particles organized in an elongate arrangement (as opposed to a spherical or cluster arrangement), and can appear to the naked eye as fibrous in nature. More particularly, each chain agglomeration of nano-scale metal particles has an aspect ratio, that is, ratio of major dimension (i.e., length) to minor dimension (i.e., width or diameter) of at least about 700:1, more advantageously at least about 900:1. As such, the surface area of the nano-scale metal particle chain agglomerations makes the agglomerations uniquely effective in applications such as catalysis. Indeed, such chain agglomerations can be especially useful in an emission control device in accordance with this disclosure, as they can extend into the exhaust stream to increase catalytic contact.

In practice, a decomposable metal-containing moiety is fed into a reactor vessel and sufficient energy to decompose the moiety applied, such that the moiety decomposes and nano-scale metal particles are deposited on a support or in a collector. The decomposable moiety can be any decomposable metal-containing material, including an organometallic compound, a metal complex or a metal coordination compound, provided that the moiety can be decomposed to provide free metals under the conditions existing in the reactor vessel, such that the free metal can be deposited on a support or collected by a collector. One example of a suitable moiety for use herein is a metal carbonyl, such as nickel or iron carbonyls, or noble metal carbonyls.

The production of chain agglomerations is advantageously practiced in an apparatus comprising a reactor vessel, at least one feeder for feeding or supplying the decomposable moiety into the reactor vessel, a support or collector which is operatively connected to the reactor vessel for deposit or collection of nano-scale metal particles produced on decomposition of the decomposable moiety, and a source of energy capable of decomposing the decomposable moiety. The source of energy should act on the decomposable moiety such that the moiety decomposes to provide nano-scale metal particles which are deposited on the support or collected by the collector.

The reactor vessel can be formed of any material which can withstand the conditions under which the decomposition of the moiety occurs. Generally, where the reactor vessel is a closed system, that is, where it is not an open ended vessel permitting reactants to flow into and out of the vessel, the vessel can be under subatmospheric pressure, by which is meant pressures as low as about 250 millimeters (mm) Hg. Indeed, the use of subatmospheric pressures, as low as about 1 mm Hg of pressure, can accelerate decomposition of the decomposable moiety and provide smaller nano-scale particles. However, one advantage is the ability to produce nano-scale particles at generally atmospheric pressure, i.e., about 760 mm Hg. Alternatively, there may be advantage in cycling the pressure, such as from sub-atmospheric to generally atmospheric or above, to encourage nano-deposits within the structure of the particles or supports. Of course, even in a so-called "closed system," there needs to be a valve or like system for relieving pressure build-up caused, for instance, by the generation of carbon monoxide (CO) or other by-products. Accordingly, the use of the expression "closed system" is meant to distinguish the system from a flow-through type of system as discussed hereinbelow.

When the reactor vessel is a "flow-through" reactor vessel, that is, a conduit through which the reactants flow while reacting, the flow of the reactants can be facilitated by drawing a partial vacuum on the conduit, although no lower than about 250 mm Hg is necessary in order to draw the reactants through the conduit towards the vacuum apparatus, or a flow of an inert gas such as nitrogen or argon can be pumped through the conduit to thus carry the reactants along the flow of the inert gas.

Indeed, the flow-through reactor vessel can be a fluidized bed reactor, where the reactants are borne through the reactor on a stream of a fluid. This type of reactor vessel may be especially useful where the nano-scale metal particles produced are intended to be loaded on support materials, like carbon blacks or the like, or where the metal particles are to be loaded on an ion exchange or similar resinous material.

The at least one feeder supplying the decomposable moiety into the reactor vessel can be any feeder sufficient for the purpose, such as an injector which carries the decomposable moiety along with a jet of a gas such as an inert gas like argon or nitrogen, to thereby carry the decomposable moiety along the jet of gas through the injector nozzle and into the reactor vessel. The gas employed can be a reactant, like oxygen or ozone, rather than an inert gas. This type of feeder can be used whether the reactor vessel is a closed system or a flow-through reactor.

Supports useful herein can be any material on which the nano-scale metal particles produced from decomposition of the decomposable moieties can be deposited.

The support or collector can be disposed within the reactor vessel (indeed this is required in a closed system and is practical in a flow-through reactor). However, in a flow-through reactor vessel, the flow of reactants can be directed at a support positioned outside the vessel, at its terminus, especially where the flow through the flow-through reactor vessel is created by a flow of an inert gas. Alternatively, in a flow-through reactor, the flow of nano-scale metal particles produced by decomposition of the decomposable moiety can be directed into a centrifugal or cyclonic collector which collects the nano-scale particles in a suitable container for future use.

The energy employed to decompose the decomposable moiety can be any form of energy capable of accomplishing this function. For instance, electromagnetic energy such as infrared, visible, or ultraviolet light of the appropriate wavelengths can be employed. Additionally, microwave and/or radio wave energy, or other forms of sonic energy can also be employed (example, a spark to initiate "explosive" decomposition assuming suitable moiety and pressure), provided the decomposable moiety is decomposed by the energy employed. Thus, microwave energy, at a frequency of about 2.4 gigahertz (GHz) or induction energy, at a frequency which can range from as low as about 180 hertz (Hz) up to as high as about 13 mega Hz can be employed. A skilled artisan would readily be able to determine the form of energy useful for decomposing the different types of decomposable moieties which can be employed.

One preferred form of energy which can be employed to decompose the decomposable moiety is heat energy supplied by, e.g., heat lamps, radiant heat sources, or the like. Such heat can be especially useful for highly volatile moieties, such as metal carbonyls in transparent vessels. In such case, the temperatures needed are no greater than about 500° C., and generally no greater than about 250° C. Indeed, generally, temperatures no greater than about 200° C. are needed to decompose the decomposable moiety and produce nano-scale metal particles therefrom.

Depending on the source of energy employed, the reactor vessel should be designed so as to not cause deposit of the nano-scale metal particles on the vessel itself (as opposed to the collector) as a result of the application of the source of energy. In other words, if the source of energy employed is heat, and the reactor vessel itself becomes heated to a temperature at or somewhat higher than the decomposition temperature of the decomposable moiety during the process of applying heat to the decomposable moiety to effect decomposition, then the decomposable moiety will decompose at the walls of the reactor vessel, thus coating the reactor vessel walls with nano-scale metal particles rather than collecting the nano-scale metal particles with the collector (one exception to this general rule occurs if the walls of the vessel are so hot that the decomposable moiety decomposes within the reactor vessel and not on the vessel walls, as discussed in more detail below).

One way to avoid this is to direct the energy directly at the collector. For instance, if heat is the energy applied for decomposition of the decomposable moiety, the support or collector can be equipped with a source of heat itself, such as a resistance heater in or at a surface of the support or collector such that the support or collector is at the temperature needed for decomposition of the decomposable moiety and the reactor vessel itself is not. Thus, decomposition occurs at the support or collector and formation of nano-scale particles occurs principally at the support or collector. When the source of energy employed is other than heat, the source of energy can be chosen such that the energy couples with the support or collector, such as when microwave or induction energy is employed. In this instance, the reactor vessel should be formed of a material which is relatively transparent to the source of energy, especially as compared to the support or collector.

For the production of the chain agglomerations, the source of heat is advantageously a resistance heater, such as a wire, disposed within the flow of decomposable moieties. The heated wire provides a point of contact for the decomposition of decomposable moieties to form nano-scale metal particles; additional decomposition then occurs on the previously formed particles, and continues as chains of nano-scale metal particles are formed from these initial particles produced on the wire. While the precise mechanism for this phenomenon is not fully understood, it is believed that decomposition of decomposable moieties to produce nano-scale metal particles occurs by conduction along the chain as it forms. In other words, nano-scale metal particles are formed on the wire, which then cause further decomposition of decomposable moieties thereon by heat conduction along the metal particles formed on the wire, and so on.

Especially in situations when the support or collector is disposed outside the reactor vessel when a flow-through reactor vessel is employed with a support or collector at its terminus (whether a solid substrate collector for depositing of nano-scale metal particles thereon or a cyclonic or like collector for collecting the nano-scale metal particles for a suitable container), the decomposition of the decomposable moiety occurs as the moiety is flowing through the flow-through reactor vessel and the reactor vessel should be transparent to the energy employed to decompose the decomposable moiety.

Alternatively, whether or not the support or collector is inside the reactor vessel, or outside it, the reactor vessel can be maintained at a temperature below the temperature of decomposition of the decomposable moiety, where heat is the energy employed. One way in which the reactor vessel can be maintained below the decomposition temperatures of the moiety is through the use of a cooling medium like cooling coils or a cooling jacket. A cooling medium can maintain the walls of the reactor vessel below the decomposition temperatures of the decomposable moiety, yet permit heat to pass within the reactor vessel to heat the decomposable moiety and cause decomposition of the moiety and production of nano-scale metal particles.

In an alternative embodiment which is especially applicable where both the walls of the reactor vessel and the gases in the reactor vessel are generally equally susceptible to the heat energy applied (such as when both are relatively transparent), heating the walls of the reactor vessel, when the reactor vessel is a flow-through reactor vessel, to a temperature substantially higher than the decomposition temperature of the decomposable moiety can permit the reactor vessel walls to themselves act as the source of heat. In other words, the heat radiating from the reactor walls will heat the inner spaces of the reactor vessel to temperatures at least as high as the decomposition temperature of the decomposable moiety. Thus, the moiety decomposes before impacting the vessel walls, forming nano-scale particles which are then carried along with the gas flow within the reactor vessel, especially where the gas velocity is enhanced by a vacuum. This method of generating decomposition heat within the reactor vessel is also useful where the nano-scale particles formed from decomposition of the decomposable moiety are being attached to carrier materials (like carbon black) also being carried along with the flow within the reactor vessel. In order to heat the walls of the reactor vessel to a temperature sufficient to generate decomposition temperatures for the decomposable moiety within the reactor vessel, the walls of the reactor vessel are preferably heated to a temperature which is significantly higher than the temperature desired for decomposition of the decomposable moiety(ies) being fed into the reactor vessel, which can be the decomposition temperature of the decomposable moiety having the highest decomposition temperature of those being fed into the reactor vessel, or a temperature selected to achieve a desired decomposition rate for the moieties present. For instance, if the decomposable moiety having the highest decomposition temperature of those being fed into the reactor vessel is nickel carbonyl, having a decomposition temperature of about 50° C., then the walls of the reactor vessel should preferably be heated to a temperature such that the moiety would be heated to its decomposition temperature several (at least three) millimeters from the walls of the reactor vessel. The specific temperature is selected based on internal pressure, composition and type of moiety, but generally is not greater than about 250° C. and is typically less than about 200° C. to ensure that the internal spaces of the reactor vessel are heated to at least 50° C.

In any event, the reactor vessel, as well as the feeders, can be formed of any material which meets the requirements of temperature and pressure discussed above. Such materials include a metal, graphite, high density plastics or the like. Most preferably the reactor vessel and related components are formed of a transparent material, such as quartz or other forms of glass, including high temperature glass commercially available as Pyrex® materials.

In one embodiment of the process of this disclosure, a single feeder feeds a single decomposable moiety into the reactor vessel for formation of nano-scale metal particles. In another embodiment, however, a plurality of feeders each feeds decomposable moieties into the reactor vessel. In this way, all feeders can feed the same decomposable moiety or different feeders can feed different decomposable moieties, such as additional metal carbonyls, so as to provide nano-scale particles containing different metals such as platinum-nickel combinations or nickel-iron combinations as desired, in proportions determined by the amount of the decomposable moiety fed into the reactor vessel. For instance, by feeding different decomposable moieties through different feeders, one can produce a nano-scale particle having a core of a first metal, with domains of a second or third, etc. metal coated thereon. Indeed, altering the decomposable moiety fed into the reactor vessel by each feeder can alter the nature and/or constitution of the nano-scale particles produced. In other words, if different proportions of metals making up the nano-scale particles, or different orientations of the metals making up the nano-scale particles is desired, altering the decomposable moiety fed into the reactor vessel by each feeder can produce such different proportions or different orientations.

Indeed, in the case of the flow-through reactor vessel, each of the feeders can be arrayed about the circumference of the conduit forming the reactor vessel at approximately the same location, or the feeders can be arrayed along the length of the conduit so as to feed decomposable moieties into the reactor vessel at different locations along the flow path of the conduit to provide further control of the nano-scale particles produced.

In an embodiment, the present disclosure provides a process for facilitating catalysis by providing the catalyst-containing carbon foam substrates disclosed above, and flowing a gas or fluid containing reactants therethrough. In certain embodiments, this disclosure includes a process for reducing disadvantageous emissions from a vehicle exhaust, where the process includes providing the carbon foam described above, applying at least one of oxidative and reductive washcoats to the carbon foam, wherein the oxidative and reductive washcoats include precious metals, non-noble metal nano-scale particles, or combinations thereof, fitting the carbon foam into a shell to form an emission control device, and connecting the device to a vehicle engine for treating exhaust gas. The emission control device can be connected to the vehicle engine by being positioned in the tailpipe such that exhaust gases flow therethrough. In yet another embodiment, this disclosure includes a process for reducing disadvantageous emissions from a vehicle exhaust which includes providing the carbon foam described above, having catalytic metals incorporated thereinto, wherein the catalytic metals can be precious metals, non-noble metal nano-scale particles, or combinations thereof, fitting the carbon foam into a shell to form an emission control device, and connecting the device to a vehicle engine for treating exhaust gas. The emission control device can be connected to the vehicle engine by being positioned in the tailpipe such that exhaust gases flow therethrough.

The substrates in accordance with this disclosure can provide emissions reduction equivalent to or even better than conventional emission control devices, while potentially reducing pressure drop and the amount of catalytic metal employed. Catalyst loading on the carbon foam substrate of the present disclosure can be as low as 55 g/ft$^3$, and can range as high as 325 g/ft$^3$ depending on the engine and performance characteristics desired. In some embodiments, catalyst loading is between about 65 g/ft$^3$ and about 275 g/ft$^3$; in other embodiments, catalyst loading is between about 80 g/ft$^3$ and about 250 g/ft$^3$.

As such, use of the disclosed carbon foam substrates, and emission control devices, can potentially meet or exceed emissions reduction requirements while simultaneously increasing horsepower and engine efficiency because of the reduced pressure drop. And, in some embodiments these advantages can be achieved at a lower cost.

All references cited in this specification, including without limitation, all patents, patent applications, and publications, and the like, are hereby incorporated by reference into this specification in their entireties. The discussion of the references herein is intended merely to summarize the assertions made by their authors and no admission is made that any reference constitutes prior art. Applicant reserves the right to challenge the accuracy and pertinence of the cited references.

Although embodiments of the disclosure have been described using specific terms, devices, and methods, such description is for illustrative purposes only. The words used are words of description rather than of limitation. It is to be understood that changes and variations may be made by those of ordinary skill in the art without departing from the spirit or the scope of the present disclosure, which is set forth in the following claims. In addition, it should be understood that aspects of the various embodiments may be interchanged in whole or in part. For example, while methods for the production of a commercially sterile liquid nutritional supplement made according to those methods have been exemplified, other uses are contemplated. Therefore, the spirit and scope of the appended claims should not be limited to the description of the versions contained therein.

What is claimed is:

1. A catalysis substrate which comprises an open cell carbon foam having a geometric surface area of at least about 5000 $m^2/m^3$, wherein the carbon foam comprises catalyst particles thereon or therein.

2. The substrate of claim 1, which is formed from foam starting materials selected from the group consisting of phenolic foam, polyurethane foam, polyacrylonitrile, other acrylonitrile materials, and foams derived from organic gels.

3. The substrate of claim 1, wherein the catalyst particles comprise precious metals, non-noble metal nano-scale catalytic particles, or combinations thereof.

4. The substrate of claim 3, wherein the non-noble metal nano-scale catalytic particles comprise iron, nickel, manganese, and combinations thereof, and further wherein the non-noble metal nano-scale catalytic particles have an average diameter of no greater than about 20 nm.

5. The substrate of claim 4, wherein the non-noble metal nano-scale catalytic particles are present in chain agglomerations which have an aspect ratio of at least 700:1.

6. The substrate of claim 1, wherein the substrate has a permeability of at least about 12.0 darcys.

7. The substrate of claim 3, wherein the catalyst particles are incorporated into at least one washcoat which is coated on the carbon foam.

8. The substrate of claim 3, wherein the catalyst particles are incorporated into the carbon foam which forms the substrate.

9. The substrate of claim 1, wherein the substrate has a geometric surface area of at least about 8,000 $m^2/m^3$.

10. The substrate of claim 1, wherein catalytic loading is between about 55 $g/ft^3$ and about 325 $g/ft^3$.

11. The substrate of claim 1, which creates a pressure drop of no greater than 120 Pa when gas flows through at a velocity of 0.025 $m^3/s$.

12. An emission control device for a vehicle, comprising a substrate which comprises an open cell carbon foam having a geometric surface area of at least about 5000 $m^2/m^3$, wherein the carbon foam comprises catalyst particles thereon or therein.

13. The substrate of claim 12, wherein the substrate is formed from foam starting materials selected from the group consisting of phenolic foam, polyurethane foam, polyacrylonitrile, other acrylonitrile materials, and foams derived from organic gels.

14. The emission control device of claim 12, wherein the catalyst particles comprise precious metals, non-noble metal nano-scale catalytic particles, or combinations thereof.

15. The emission control device of claim 14, wherein the non-noble metal nano-scale catalytic particles comprise iron, nickel, manganese, and combinations thereof, and further wherein the nano-scale catalytic particles have an average diameter of no greater than about 20 nm.

16. The emission control device of claim 15, wherein the non-noble metal nano-scale catalytic particles are present in chain agglomerations which have an aspect ratio of at least 700:1.

17. The emission control device of claim 12, wherein the substrate has a permeability of at least about 12.0 darcys.

18. The emission control device of claim 14, wherein the catalyst particles are incorporated into at least one washcoat which is coated on the carbon foam.

19. The emission control device of claim 14, wherein the catalyst particles are incorporated into the carbon foam which forms the substrate.

20. The emission control device of claim 12, wherein the substrate has a geometric surface area of at least about 8,000 $m^2/m^3$.

21. The emission control device of claim 12, wherein catalytic loading is between about 55 $g/ft^3$ and about 325 $g/ft^3$.

22. The emission control device of claim 12, which creates a pressure drop of no greater than 120 Pa when gas flows through at a velocity of 0.025 $m^3/s$.

23. The emission control device of claim 12, wherein the device is a catalytic converter.

24. The emission control device of claim 12, wherein the device is a diesel particulate trap, and the carbon foam substrate is at least partially graphitized.

* * * * *